United States Patent
Riley

(10) Patent No.: US 7,168,254 B2
(45) Date of Patent: Jan. 30, 2007

(54) CONTROL LOGIC FOR FUEL CONTROLS ON APUS

(75) Inventor: Harold J. Riley, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 303 days.

(21) Appl. No.: 10/781,154

(22) Filed: Feb. 17, 2004

(65) Prior Publication Data
US 2006/0254282 A1    Nov. 16, 2006

(51) Int. Cl.
F02C 7/28 (2006.01)
(52) U.S. Cl. .................. 60/773; 60/39.281
(58) Field of Classification Search ........... 60/39.281, 60/773, 778, 790
See application file for complete search history.

(56) References Cited

U.S. PATENT DOCUMENTS

| | | | |
|---|---|---|---|
| 3,667,218 A | 6/1972 | Davis | |
| 4,128,995 A | 12/1978 | Toot | |
| 4,337,615 A | 7/1982 | LaCroix | |
| 4,350,008 A | 9/1982 | Zickwolf, Jr. | |
| 4,809,497 A | 3/1989 | Schuh | |
| 5,165,223 A | 11/1992 | Ingham et al. | |
| 5,212,943 A * | 5/1993 | Harris | 60/790 |
| 5,231,822 A | 8/1993 | Shekleton | |
| 5,235,812 A | 8/1993 | Klaass et al. | |
| 5,274,996 A | 1/1994 | Goff et al. | |
| 5,636,507 A * | 6/1997 | Rajamani et al. | 60/773 |
| 6,182,438 B1 | 2/2001 | Weber | |
| 6,945,030 B2 * | 9/2005 | Hirayama et al. | 60/39.281 |

FOREIGN PATENT DOCUMENTS

WO    WO 02/064951    8/2002

OTHER PUBLICATIONS

PCT International Search Report PCT/US2005/005571.

* cited by examiner

*Primary Examiner*—L. J. Casaregola
(74) *Attorney, Agent, or Firm*—Ingrassia Fisher & Lorenz

(57) ABSTRACT

Conventional auxiliary power units (APUs) may experience over-temperature shutdowns when attempting to start them at high altitudes. Further, such conventional APUs may also experience overspeed conditions when a generator load is removed during on-speed operations. A fuel control logic that controls the fuel flow cutback below the minimum blowout fuel schedule is provided. A temperature trim loop measures engine temperature to determine the onset of a possible over-temperature condition. The fuel flow may then be trimmed accordingly to correct this over-temperature onset. Further, when the onset of an overspeed condition is detected, such as when a generator load is removed, the fuel flow may be trimmed accordingly to correct this overspeed onset. The fuel control logic allows the control to find the individual minimum fuel flow for each fuel control without risking blowout of the APU itself.

10 Claims, 5 Drawing Sheets

CONTROL LOGIC FOR FUEL CONTROLS ON APUS

BACKGROUND OF THE INVENTION

The present invention relates generally to control logic for fuel controls on an auxiliary power unit (APU) and, in particular, to a control logic that allows the electronic control to command fuel flows below the programmed lean blowout limit when certain conditions are true.

In addition to their traditional propulsion functions, gas turbine engines are often used as APUs to supply mechanical, electrical and/or pneumatic power to a wide variety of aircraft systems. For example, the APU can be used to start the main engines, supply compressed air to the aircraft's environmental control system, or provide electrical power. Historically, APUs have only been operated when the aircraft was on the ground.

Recent developments in aircraft design have witnessed the advent of twin engine aircraft capable of long distance, transoceanic flights. A disadvantage to the twin engine design is that when a main engine experiences an inflight shutdown, the enormous burden of supplying the aircraft with power falls on the sole, remaining engine. Early on in the development of these aircraft, it was recognized that they would need an additional source of power while inflight. To meet this need, it was proposed to start and operate the APU inflight.

A gas turbine APU includes in flow series arrangement a compressor, a combustor, a turbine and a shaft coupling the turbine to the compressor. During a normal, sea level start, a starter motor applies a starting torque to the APU's shaft. As the shaft starts to rotate, air is inducted into the compressor, compressed and then discharged in the combustor. Concurrently, the APU's fuel control system feeds fuel into the combustor in accordance with a predetermined fuel schedule to precisely maintain the proper fuel to air ration in the combustor. At a rotational speed of about 10 to 20 percent of the APU's operating speed, the condition in the combustor becomes such that the fuel/air mixture can be ignited. This condition is generally referred to as light-off. Should the fuel to air ratio be either too rich or too lean, light-off will not occur and the APU will experience a hung start. After light-off, the start motor torque is augmented by torque from the APU's turbine. At about 50 percent of operating speed, the start motor is shut off and the APU becomes self-sustaining and accelerates itself to operating speed.

To start an APU at high altitude (e.g., 40,000 feet) after the APU has become cold soaked by continuous exposure to cold ambient temperatures (e.g., −70F) is a much more difficult task for the APU's fuel control system. The cold temperature increases the APU's drag necessitating greater starting torque. Further, the cold fuel poorly atomized. Poor atomization combined with low air density makes it both difficult to precisely obtain the necessary fuel to air ratio to accomplish light-off, and to provide a sufficient fuel flow rate to the combustor to prevent blowout while not providing too high a fuel flow rate which may result in excessive turbine inlet temperatures.

Conventional fuel control logic has two significant problems. First, as mentioned above, starting APUs at high altitudes often result in over-temperature shutdowns due to tolerances in the fuel control during low fuel flows. These tolerances may include the difference between the actual fuel flow vs the milliamp (ma) command fuel flow based upon the conventional fuel control logic. When an over-temperature condition is detected, the fuel supply is cut back. However, conventional fuel control logic limits the fuel flow temperature cutback to a minimum command to prevent blowout on a nominal fuel control. In other words, there is a pre-programmed lean limit to the minimum fuel flow that may occur. This pre-programmed lean limit is determined at a level to avoid blowout of the engine.

Low fuel flows may be difficult to accurately measure and, therefore, conventional fuel control logic may require the use of a fuel flow feedback mechanism to calibrate the commanded fuel flows. However, degradation in these fuel feedback mechanisms as well as other engine tolerances often has an effect on the true lean stability limit, which may be lower than the pre-programmed lean limit. Optionally, the fuel flow at low flows may be measured to tighter standards. However, both of these approaches may result in a significant cost impact to the system design.

A second problem with conventional fuel control logic occurs during on-speed operation of APUs (constant speed) at high altitudes. Here, tolerances in the fuel control during low fuel flows may cause the speed of the APU to react slowly to unloading of electrical loads. The fuel controls limit the fuel flow cutback to a minimum command to prevent blowout on a nominal fuel control. However, engine overspeed may occur because the fuel flow is required to be at or above a minimum, preprogrammed fuel flow. As with solutions to the first problem, low fuel flows may be difficult to accurately measure and, therefore, conventional fuel control logic may require the use of a fuel flow feedback mechanism to calibrate the commanded fuel flows. Optionally, the fuel flow at low flows may be measured to tighter standards. However, both of these approaches may result in a significant cost impact to the system design.

U.S. Pat. Nos. 5,274,996 and 5,303,541, issued to Goff et al., describe using a closed loop system on measured fuel flow to more accurately control fuel flow and improve starting reliability. The commanded fuel flow may be trimmed until it matches measured fuel flow. The APUs of Goff, however, may experience fuel flow meter failures and fuel tolerance problems, causing failures of the APU to start at high altitudes.

U.S. Pat. No. 4,128,995, issued to Toot, discloses a method and apparatus for stabilizing an augmenter system. More specifically, the patent discloses stabilizing a turbofan at high speed, high altitude flight conditions by reducing the maximum augmenter fuel/air ration in response to certain pressure and temperature conditions. The Toot patent specifically addresses a rich stability problem within the combustor. The reference does not discuss the issues of lean stability and minimum fuel flow tolerances.

As can be seen, there is a need for an improved fuel control logic that will allow the electronic control to command fuel flows below the pre-programmed lean blowout limit when certain conditions are true, thus avoiding overspeed and over-temperature conditions.

SUMMARY OF THE INVENTION

In one aspect of the present invention, a method for correcting and/or preventing an over-temperature condition in an auxiliary power unit comprises measuring an exhaust gas temperature of the auxiliary power unit; comparing the exhaust gas temperature to a temperature trim limit; calculating a fuel flow trim value; subtracting the fuel flow trim value from a starting fuel flow value to get a trimmed commanded fuel flow value; and delivering fuel to the auxiliary power unit at said trimmed commanded fuel flow value.

In another aspect of the present invention, a method for correcting and/or preventing an overspeed condition in an auxiliary power unit comprises measuring the speed of the auxiliary power unit; comparing the speed to a predetermined speed reference point to determine a speed error; calculating a fuel flow trim value from the speed error; subtracting the fuel flow trim value from a commanded fuel flow value to get a trimmed commanded fuel flow value; and delivering fuel to the auxiliary power unit at said trimmed commanded fuel flow value.

In yet another aspect of the present invention, a method for correcting and/or preventing an overspeed condition during on-speed operation of an auxiliary power unit in an aircraft comprises measuring the speed of the auxiliary power unit; comparing the speed to a predetermined speed reference point to determine a speed error; calculating a fuel flow trim value from the speed error; subtracting the fuel flow trim value from a commanded fuel flow value to get a trimmed commanded fuel flow value; providing an upper limit on said the fuel flow trim value at a predetermined maximum fuel schedule; determining a blowout prevention rate; comparing the trimmed commanded fuel flow value to a predetermined minimum fuel schedule to determine a possibility of blowout at the trimmed commanded fuel flow value; delivering fuel to the auxiliary power unit at the blowout prevention rate when the possibility of blowout is present, thereby preventing blowout of the auxiliary power unit; and delivering fuel to the auxiliary power unit at said trimmed commanded fuel flow value when the possibility of blowout is not present.

In a further aspect of the present invention, a method for preventing and/or correcting undesired operating conditions of an auxiliary power unit comprises calculating an engine starting trimmed commanded fuel flow value by measuring an exhaust gas temperature of the auxiliary power unit; comparing the exhaust gas temperature to a temperature trim limit; calculating a fuel flow trim value; subtracting the fuel flow trim value from a starting fuel flow value to get the engine starting trimmed commanded fuel flow value; starting the auxiliary power unit with a fuel flow rate at the engine starting trimmed commanded fuel flow value; calculating an on-speed trimmed commanded fuel flow value by measuring the speed of the auxiliary power unit; comparing the speed to a predetermined speed reference point to determine a speed error; calculating an on-speed fuel flow trim value from the speed error; subtracting the on-speed fuel flow trim value from a commanded fuel flow value to get the on-speed trimmed commanded fuel flow value; continuing the running of the auxiliary power unit with a fuel flow rate at the on-speed trimmed commanded fuel flow value.

In still a further aspect of the present invention, a fuel control logic for an auxiliary power unit comprises an over-temperature prevention and/or correcting mechanism to prevent an over-temperature condition from occurring during starting of the auxiliary power unit; the over-temperature prevention and/or correcting mechanism operating by measuring an exhaust gas temperature of the auxiliary power unit; comparing the exhaust gas temperature to a temperature trim limit; calculating a fuel flow trim value; subtracting the fuel flow trim value from a starting fuel flow value to get a trimmed commanded fuel flow value; and delivering fuel to the auxiliary power unit at said trimmed commanded fuel flow value.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Briefly, the present invention provides a method and apparatus for controlling a minimum fuel flow below a minimum blowout schedule, that is, below a minimum fuel flow predetermined to cause engine blowout. By doing so, the present invention provides a solution to the problem of over-temperature shutdowns when starting APUs at high altitudes, as well as to the problem of overspeed operation of APUs at high altitudes when electric loads are unloaded.

Conventional fuel control methods may adjust the fuel flow and/or the fuel/air mixture to avoid over-temperature and overspeed conditions. However, low fuel flows may be difficult to accurately measure and, therefore, conventional fuel control logic may require the use of a fuel flow feedback mechanism to calibrate the commanded fuel flows. Optionally, the fuel flow at low flows may be measured to tighter standards. However, both of these approaches may result in a significant cost impact to the system design.

In contrast, the fuel control logic of the present invention provides a method for allowing a fuel cutback to below minimum, predetermined blowout fuel schedules while maintaining the operation of the APU. The logic allows the control to find the individual minimum fuel flow for each fuel control without risking blowout on the APU itself. The fuel control logic of the present invention is useful on any gas turbine engine, especially jet engine APUs.

Figure 1:
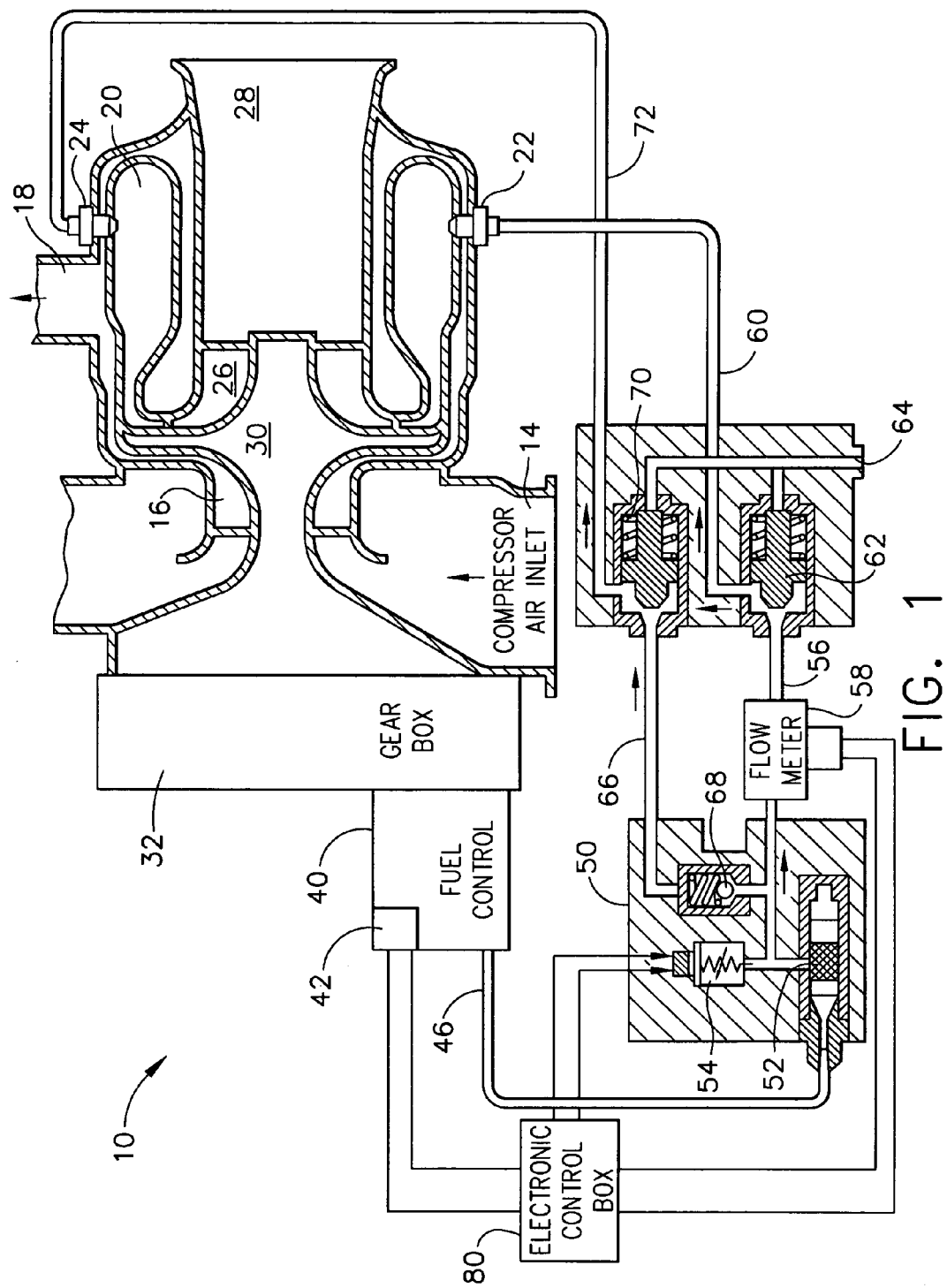
FIG. 1 is a schematic cross-section of an exemplary gas turbine auxiliary power unit having the fuel control logic of the present invention.

Referring to FIG. 1, one form of an APU to which the present invention relates is generally denoted by the reference numeral 10. APU 10 may include, in flow series arrangement, an air inlet 14, a compressor 16, a bleed port 18 for providing compressed air to the aircraft, a combustor 20 having a primary fuel nozzle 22 and a secondary fuel nozzle 24, a turbine 26, and a gas exhaust 28. Of the two nozzles 22 and 24, only primary nozzle 22 may operate during the initial stages of a startup. Compressor 16 and turbine 26 may be mounted for rotation on a shaft 30 which extends to a gearbox 32.

A fuel control unit 40 may be drivingly mounted to gearbox 32 in fluid communication with a fuel source (not shown) aboard the aircraft. In an embodiment, fuel control unit 40 may be a single stage, electromechanical fuel-metering valve of the type which is well known in the art. Fuel control unit 40 may include an electrically operated torque motor 42 which has a known and repeatable relationship with a power signal from an electronic control unit (ECU) 80 which may be analog or digital. Motor 42 may be directly coupled to a metering valve (not shown), and controls the valve position so that a known flow area in the metering valve corresponds to a known power signal from ECU 80. A regulating valve (not shown) may maintain a constant pressure drop across the metering valve so that the metered flow is a direct function of the power signal. Fuel control unit 40 may receive fuel from the fuel source via a high-pressure fuel pump, and discharge a metered fuel flow through a conduit 46 to a flow divider 50. Other accessories (not shown) such as start motors, electrical generators and pumps can also be mounted to gearbox 32.

Flow divider 50 may include a filter 52 through which metered fuel is received via conduit 46 and then may be passed by a temperature sensor 54 which is electrically coupled to ECU 80. Downstream of sensor 54, the flow of fuel within divider 50 may be broken into a primary flow path 56 and a secondary flow path 66.

Fuel entering primary flow path 56 may flow through a conventional flow meter 58. Flow meter 58 may measure the rate of flow passing therethrough and convert this measurement to an electrical signal which is transmitted to ECU 80. After passing through flow meter 58, the stream of fuel may enter a conduit 60 which leads to primary fuel nozzle 22. Disposed between flow meter 58 and conduit 60 may be a primary drain valve 62 which, when open, places conduit 60 in fluid communication with a drain port 64 and, when closed, with conduit 46.

Fuel may only enter secondary flow path 66 when its pressure is sufficient to open a start sequence valve 68. When valve 68 is open, fuel may flow past a secondary drain valve 70 similar to primary drain valve 62 and into a conduit 72 that leads to secondary fuel nozzle 24. When valve 70 is closed, conduit 72 may be placed in fluid communication with drain port 64.

Prior to starting APU 10, start sequence valve 68 may be closed and drain valves 62 and 70 may be opened. Upon receiving a signal from ECU 80, fuel control unit 40 may meter fuel from the fuel source to divider 50 and through primary flow path 56, wherein primary drain valve 62 may close and fuel may flow to primary fuel nozzles 22. During this time the fuel flow in primary flow path 56 may be measured by flow meter 58. After light-off, the fuel pressure may increase until start sequence valve 68 opens, and secondary drain valve 70 may close, and fuel may start flowing to secondary nozzles 24.

While the above APU 10 has been described using flow meter 58 on primary flow path 56, the fuel flow may also be measured on the entire flow. In other words, a second flow meter (not shown) may be used on secondary flow path 66 and a combined fuel flow measurement, from both primary flow path 56 and secondary flow path 66, may be taken.

Figure 2:
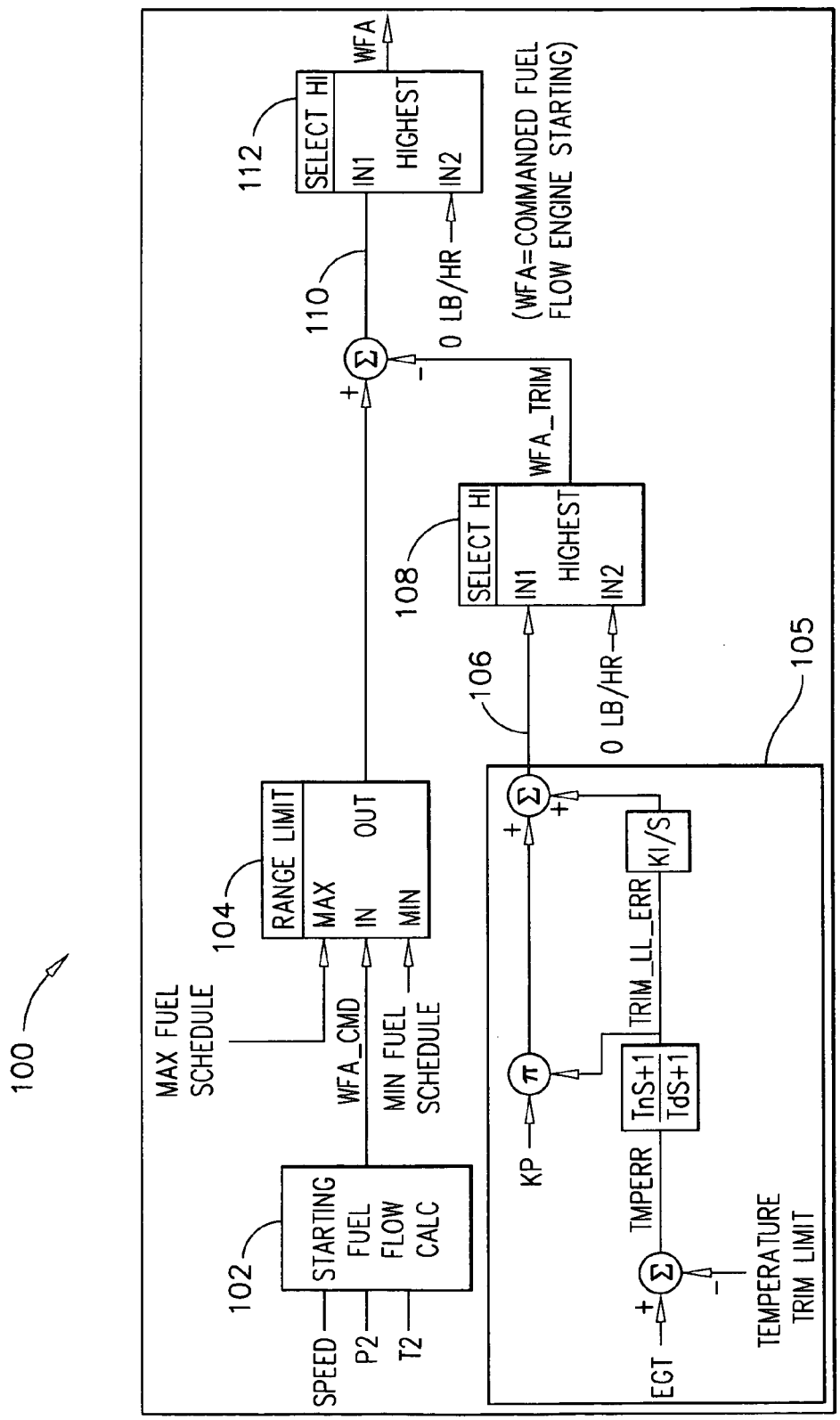
FIG. 2 is a schematic diagram showing the starting command fuel flow logic according to the present invention.
Figure 3A:
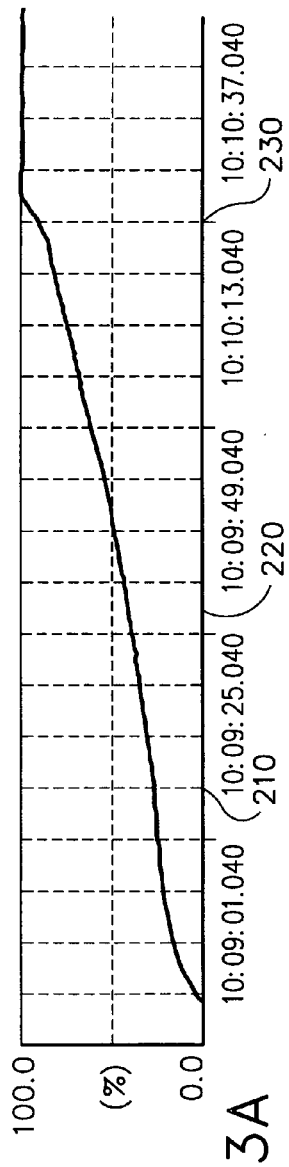
FIG. 3 is a series of graphs showing various engine statistics over time during APU start according to the present invention.
Figure 3B:
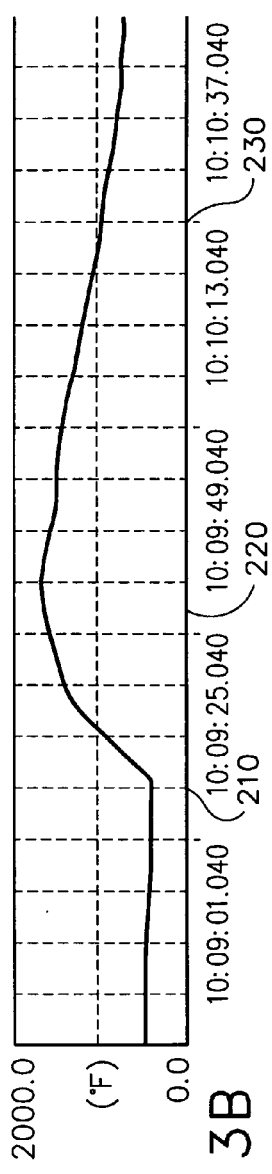
Figure 3C:
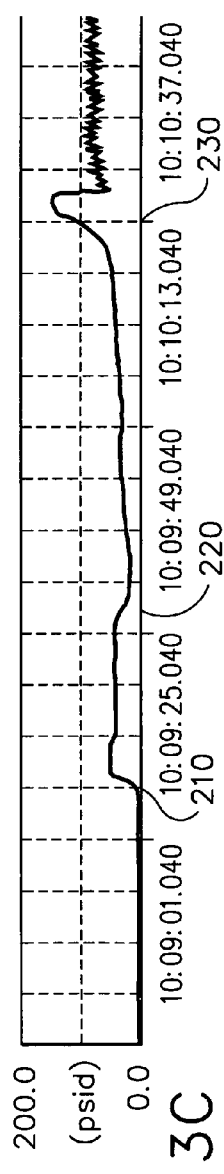
Figure 3D:
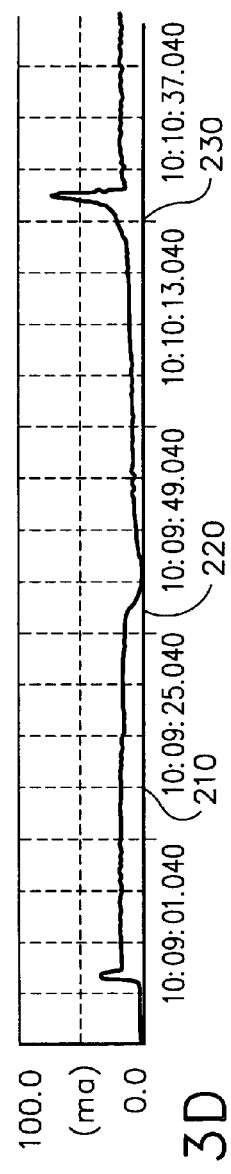
Figure 4:
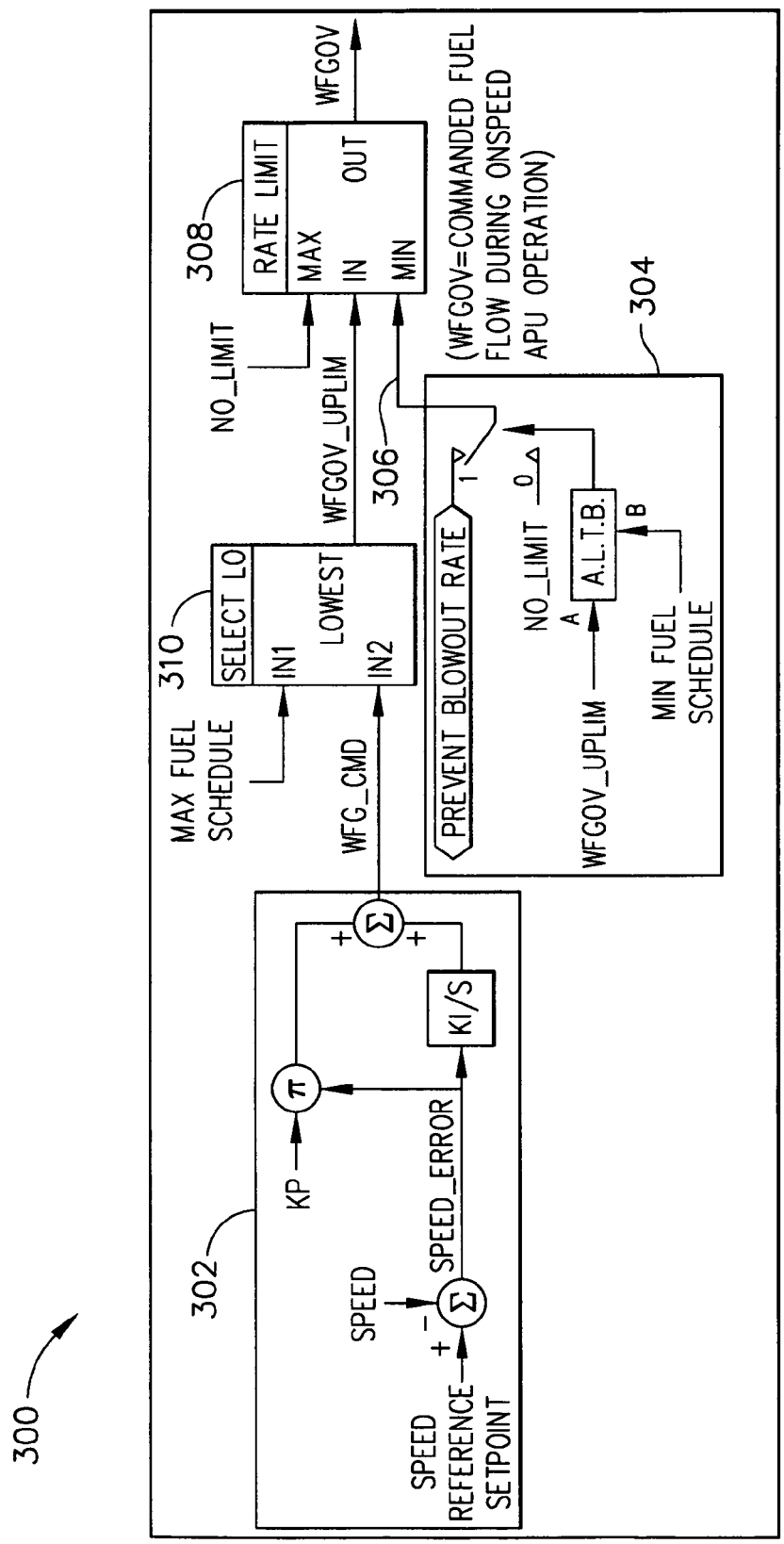
FIG. 4 is a schematic diagram showing the APU on-speed commanded fuel flow logic according to the present invention.

Fuel control logics 100 and 200, illustrated in FIGS. 2 and 4, respectively, may be incorporated within ECU 80. These fuel control logics may provide for both starting commanded fuel flow and APU on-speed commanded fuel flow.

Referring to FIG. 2, there is shown fuel control logic 100 for an engine starting commanded fuel flow WFA. Function block 102 may take input of various parameters—such as APU speed, airflow pressure and temperature—to determine a calculated starting fuel flow WFA_CMD. Function block 104 may verify that calculated starting fuel flow WFA_CMD is between a minimum fuel schedule and a maximum fuel schedule. If so, function block 104 may output the calculated starting fuel flow WFA_CMD. If not, function block 104 may output either the maximum fuel schedule or the minimum fuel schedule, whichever is closer to the calculated starting fuel flow WFA_CMD.

A temperature trim logic 105 may compare engine exhaust gas temperature EGT to a predetermined temperature trim limit to get a temperature error TMPERR. The trim error TRIM_LL_ERR may then be executed through a proportional (with proportional controller KP) plus integral (with integral controller KI/S) feedback routine. The output of this routine, indicated at arrow 106, may pass into function block 108. If output 106 is greater than zero lb/hour, function block 108 may output a trim fuel flow WFA_TRIM the same as output 106. If output 106 is not greater than zero, trim fuel flow WFA_TRIM is zero.

Trim fuel flow WFA_TRIM may then be subtracted from the output of function block 104 to give an output 110. Function block 112 may compare output 110 to a flow rate of zero and output the higher flow rate as a commanded fuel flow WFA. This commanded fuel flow WFA may then used for engine starting.

In summary, the present invention may use temperature trim logic 105 during engine starting to allow the fuel to trim back below the lean blowout schedule, if necessary. By measuring the engine exhaust gas temperature EGT, a trimmed fuel flow WFA_TRIM may be determined to lower the calculated fuel flow below the minimum fuel schedule, thus avoiding an engine over-temperature condition.

Referring to FIG. 3, and for purposes of illustrating the present invention, there is shown a series of graphs depicting various engine statistics over time during APU start. Trace A shows the APU speed as a percentage of maximum speed over time; trace B shows the exhaust gas temperature EGT of the APU (° F.); trace C shows the primary fuel manifold delta pressure (psid) from which actual fuel flow can be calculated; and trace D shows the fuel control torque motor current (mA).

A first time point 210 shows where the fuel was introduced into the combustor, ignition was achieved and the exhaust gas temperature began to rise. The speed of the APU engine was also increasing at this time, being driven mostly by a starter motor as described above and in FIG. 1. At second time point 220, the temperature trim logic began to output a trim fuel flow WFA_TRIM that is greater than zero, thus causing the commanded fuel flow WFA to decrease below the minimum fuel schedule. As a result, as time goes on, past second time point 220, the exhaust gas temperature EGT decreased. At third time point 230, it can be appreciated that the exhaust gas temperature EGT was no longer in risk of resulting in an engine over-temperature condition and, therefore, the temperature trim logic no longer adjusted the commanded fuel flow WFA. Referring now to FIG. 4, there is shown a schematic diagram of the APU on-speed commanded fuel flow logic 300 according to the present invention. One purpose of this aspect of the present invention is to prevent overspeed conditions when the load upon the APU changes, such as when an electrical load is removed from the system.

A predetermined APU speed reference point may be programmed into the commanded fuel flow logic 300. The actual APU speed may then compared to the speed reference point to give SPEED_ERROR. The SPEED_ERROR may be executed through a proportional (with proportional controller KP) plus integral (with integral controller KI/S) feedback routine. The output of this routine 302, called the commanded fuel flow WFG_CMD, may pass into function block 310, which compared the commanded fuel flow WFG_CMD to the maximum fuel schedule. Function block 310 may then output the lower of these two inputs, called the commanded fuel flow upper limit WFGOV_UPLIM. A function block 308 may compare the commanded fuel flow upper limit WFGOV_UPLIM to a minimum calculated fuel flow 306 calculated by subset 304 (described below). Function block 308 may then output the commanded fuel flow during on-speed APU operation WFGOV, which is WFGOV_UPLIM restrained by the rate limits of fuel reduction 306.

Subset 304 may be used to determine the allowed fuel flow reduction rate 306 so as to prevent blowout during on-speed APU operation. The commanded fuel flow upper limit WFGOV_UPLIM may be compared with the minimum fuel schedule to determine if a rate limited fuel reduction is necessary. If no rate limited fuel reduction is determined necessary to prevent engine blowout, then the fuel reduction rate 306 may provide an input suggesting NO_LIMIT into function block 308. However, as shown in FIG. 4, if the comparison of the commanded fuel flow upper limit WFGOV_UPLIM with the minimum fuel schedule suggests that blowout may occur, the value PREVENT_BLOWOUT_RATE may be inputted into function block 308 as the fuel rate limiter to prevent engine blowout.

Figure 5A:
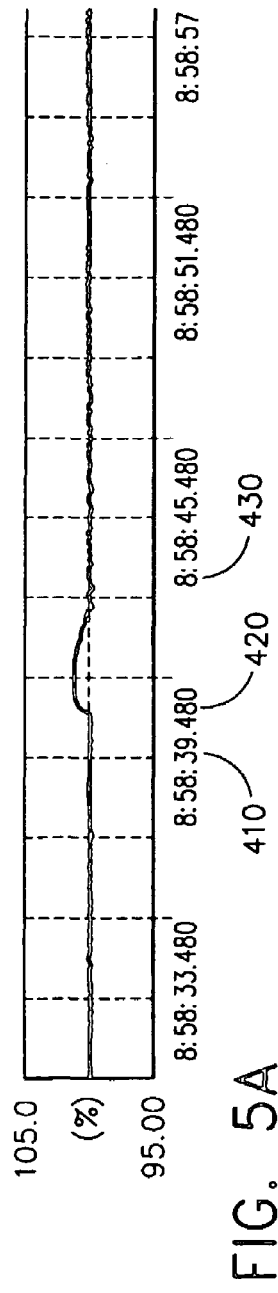
FIGS. 5A, 5B and 5C are a series of graph showing various engine statistics over time during on-speed conditions according to the present invention.
Figure 5B:
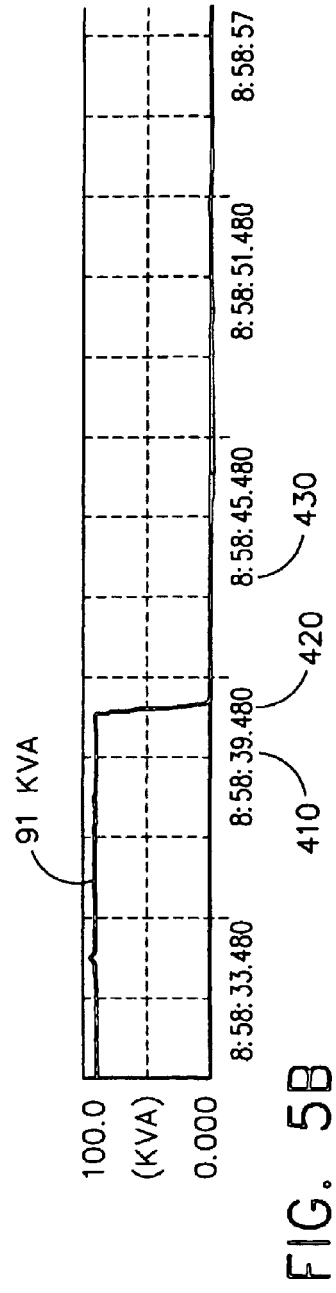
Figure 5C:
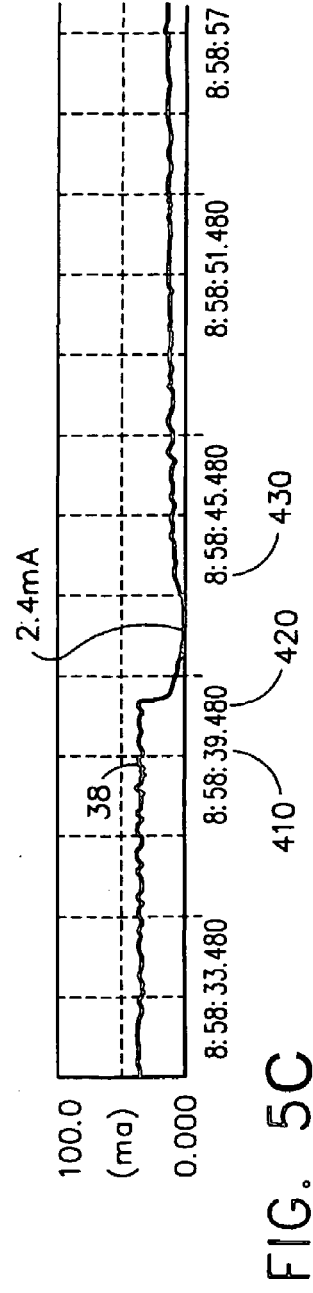

Referring now to FIGS. 5A, 5B and 5C, and for purposes of illustrating the present invention, there are shown a series of graph depicting various engine statistics over time during on-speed conditions using the on-speed commanded fuel flow logic 300 of the present invention. FIG. 5A shows the APU speed as a percentage of maximum speed over time; FIG. 5B shows the generator load (kVA); and FIG. 5C shows the fuel control unit torque motor current (mA).

At a first time point 410, the APU was operating in a normal on-speed operating condition, with the APU speed at 100%, the generator load at about 91 kVA, and the fuel control unit torque motor current at about 38 mA. At a second time point 420, the load was removed from the generator, causing the APU speed to increase above 100%. This caused the on-speed commanded fuel flow logic 300 to employ, decreasing the fuel control unit torque motor current appropriately below its minimum fuel schedule to rapidly (in this example, in about three seconds) bring the APU overspeed condition back to the 100% speed point. At a third time point 430, the fuel control unit torque motor current returns to its required to run fuel schedule to operate the APU at 100% speed with no generator load.

It should be understood, of course, that the foregoing relates to preferred embodiments of the invention and that modifications may be made without departing from the spirit and scope of the invention as set forth in the following claims.

I claim:

1. A method for correcting and/or preventing an over-temperature condition in an auxiliary power unit comprising:
   measuring an exhaust gas temperature of the auxiliary power unit;
   comparing the exhaust gas temperature to a predetermined temperature trim limit to determine a temperature trim error;
   selecting a fuel flow trim value based on the determined temperature trim error, the fuel flow trim value selected to be either (i) the determined temperature trim error, if the temperature trim error is greater than zero, or (ii) zero, if the temperature trim error is not greater than zero;
   subtracting the selected fuel flow trim value from a starting fuel flow value to get a trimmed commanded fuel flow value; and
   delivering fuel to the auxiliary power unit at said trimmed commanded fuel flow value.

2. The method according to claim 1, wherein the method is used during starting of the auxiliary power unit.

3. The method according to claim 1, further comprising determining the starting fuel flow value based upon speed, air pressure and temperature of the auxiliary power unit.

4. The method according to claim 3, further comprising providing an upper limit at a predetermined maximum fuel schedule and a lower limit at a predetermined minimum fuel schedule for the starting fuel flow value.

5. A method for correcting and/or preventing an over-temperature condition during starting of an auxiliary power unit of an aircraft comprising:
   measuring an exhaust gas temperature of the auxiliary power unit;
   comparing the exhaust gas temperature to a predetermined temperate trim limit to determine a temperature trim error;
   selecting a fuel flow trim value based on the determined temperature trim error, the fuel flow trim value selected to be either (i) the determined temperature trim error, if the temperature trim error is greater than zero, or (ii) zero, if the temperature trim error is not greater than zero;
   determining a starting fuel flow value based upon speed, air pressure and temperature of the auxiliary power unit;
   providing an upper limit at a predetermined maximum fuel schedule and a lower limit at a predetermined minimum fuel schedule for the sag fuel flow value;
   subtracting the selected fuel flow trim value from the starting fuel flow value to get a trimmed commanded fuel flow value; and
   delivering fuel to the auxiliary power unit at said trimmed commanded fuel flow value.

6. A method for preventing and/or correcting undesired operating conditions of an auxiliary power unit comprising:
   calculating an engine starting trimmed commanded fuel flow value by:
     measuring an exhaust gas temperature of the auxiliary power unit;
     comparing the exhaust gas temperature to a predetermined temperature trim limit to determine a temperature trim error;
     selecting a fuel flow trim value based on the determined temperature trim error, the fuel flow trim value selected to be either (i) the determined temperature trim error, if the temperature trim error is greater than zero, or (ii) zero, if the temperature trim error is not greater than zero;
     subtracting the selected fuel flow trim value from a staring fuel flow value to get the engine starting trimmed commanded fuel flow value;
     starting the auxiliary power unit with a fuel flow rate at the engine starting trimmed commanded fuel flow value;
   calculating an on-speed trimmed commanded fuel flow value by:

measuring the speed of the auxiliary power unit, comparing the measured speed to a predetermined speed reference point to determine a speed error, generating a commanded fuel flow from the determined speed error, comparing the commanded fuel flow to a predetermined maximum fuel schedule to determine which is lower, and selecting the lower as a commanded fuel flow upper limit, selectively limiting the commanded fuel flow upper limit to an on-speed trimmed command fuel flow value; and continuing the running of the auxiliary power unit with a fuel flow rate at either the command fuel flow upper limit or the on-speed trimmed commanded fuel flow value.

7. The method according to claim 6, further comprising determining the starting fuel flow value based upon speed, air pressure and temperature of the auxiliary power unit.

8. The method according to claim 7, further comprising providing an upper limit at the predetermined maximum fuel schedule and a lower limit at a predetermined minimum fuel schedule for the starting fuel flow value.

9. The method according to claim 6, further comprising:

determining an on-speed blowout prevention rate;

comparing the commanded fuel flow upper limit to a predetermined minimum fuel schedule to determine a possibility of blowout at the commanded fuel flow upper limit; and providing fuel to the auxiliary power unit at the on-speed blowout prevention rate when the possibility of blowout is present, thereby preventing blowout of the auxiliary power unit.

10. The method according to claim 9, further comprising providing an upper limit on the on-speed fuel flow trim value at a predetermined maximum filet schedule.

* * * * *

UNITED STATES PATENT AND TRADEMARK OFFICE
CERTIFICATE OF CORRECTION

PATENT NO. : 7,168,254 B2 Page 1 of 1
APPLICATION NO. : 10/781154
DATED : January 30, 2007
INVENTOR(S) : Harold J. Riley It is certified that error appears in the above-identified patent and that said Letters Patent is hereby corrected as shown below:

Column 8, line 38, "sag" should be changed to --starting--;
Column 8, line 61, "staring" should be changed to --starting--;
Column 10, line 17, "filet" should be changed to --fuel--.

Signed and Sealed this

Twenty-sixth Day of June, 2007

JON W. DUDAS
*Director of the United States Patent and Trademark Office*